(12) United States Patent
Kajiwara et al.

(10) Patent No.: US 11,837,693 B2
(45) Date of Patent: Dec. 5, 2023

(54) POLYOLEFIN MICROPOROUS MEMBRANE WITH IMPROVED PUNCTURE ELONGATION AND THERMOMECHANICAL PROPERTIES AND METHOD FOR MANUFACTURING THE SAME

(71) Applicant: Asahi Kasei Kabushiki Kaisha, Tokyo (JP)

(72) Inventors: Mana Kajiwara, Tokyo (JP); Hiroshi Miyazawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 634 days.

(21) Appl. No.: 16/623,981

(22) PCT Filed: Aug. 31, 2018

(86) PCT No.: PCT/JP2018/032496
§ 371 (c)(1),
(2) Date: Dec. 18, 2019

(87) PCT Pub. No.: WO2019/045077
PCT Pub. Date: Mar. 7, 2019

(65) Prior Publication Data
US 2020/0144577 A1    May 7, 2020

(30) Foreign Application Priority Data
Aug. 31, 2017  (JP) ................ 2017-167950

(51) Int. Cl.
*H01M 10/0525*  (2010.01)
*H01M 50/403*   (2021.01)
(Continued)

(52) U.S. Cl.
CPC ..... *H01M 10/0525* (2013.01); *H01M 50/403* (2021.01); *H01M 50/406* (2021.01);
(Continued)

(58) Field of Classification Search
CPC ............ H01M 50/411; H01M 50/489; H01M 50/403; H01M 50/417
(Continued)

(56) References Cited

U.S. PATENT DOCUMENTS

| 8,414,663 B2 | 4/2013 | Kimishima |
| 2010/0069596 A1 | 3/2010 | Kimishima |

(Continued)

FOREIGN PATENT DOCUMENTS

| EP | 2169742 A1 | 3/2010 |
| EP | 2169743 A1 | 3/2010 |

(Continued)

OTHER PUBLICATIONS

International Preliminary Report on Patentability and Written Opinion issued in corresponding International Patent Application No. PCT/JP2018/032496 dated Mar. 12, 2020.
(Continued)

*Primary Examiner* — Sean P Cullen
(74) *Attorney, Agent, or Firm* — Morgan, Lewis & Bockius LLP

(57) ABSTRACT

A polyolefin microporous membrane has a puncture elongation of not more than 2.30 mm. The temperature of the stress inflection point is not less than 80.0° C., and the stress peak value is not more than 1.8 gin thermomechanical analysis (TMA) measurement of the transverse direction of the polyolefin microporous membrane.

15 Claims, 3 Drawing Sheets

(a)

(b)

(51) Int. Cl.
*H01M 50/417* (2021.01)
*H01M 50/489* (2021.01)
*H01M 50/406* (2021.01)
*H01M 50/491* (2021.01)

(52) U.S. Cl.
CPC ....... *H01M 50/417* (2021.01); *H01M 50/489* (2021.01); *H01M 50/491* (2021.01)

(58) Field of Classification Search
USPC ........................................................ 429/254
See application file for complete search history.

(56) References Cited

U.S. PATENT DOCUMENTS

| | | | |
|---|---|---|---|
| 2011/0311878 A1 | 12/2011 | Inagaki et al. | |
| 2014/0315065 A1 | 10/2014 | Mizuno et al. | |
| 2015/0050544 A1* | 2/2015 | Nam | H01M 50/411 429/144 |
| 2015/0188108 A1* | 7/2015 | Miyazawa | H01M 50/491 156/60 |
| 2015/0372276 A1 | 12/2015 | Mizuno et al. | |
| 2017/0263906 A1* | 9/2017 | Sugata | H01M 50/417 |
| 2017/0263907 A1* | 9/2017 | Ameyama | C08F 220/14 |
| 2018/0166670 A1* | 6/2018 | Toyota | C08J 3/005 |
| 2018/0254455 A1* | 9/2018 | Yoshimaru | H01M 50/491 |
| 2018/0261815 A1* | 9/2018 | Ikemi | H01M 50/417 |
| 2020/0259148 A1* | 8/2020 | Miyazawa | H01M 50/449 |

FOREIGN PATENT DOCUMENTS

| | | | | |
|---|---|---|---|---|
| EP | 3124205 A1 | | 2/2017 | |
| JP | 11021361 A | * | 1/1999 | |
| JP | 3347854 B2 | | 9/2002 | |
| JP | 2005-209452 A | | 8/2005 | |
| JP | 2009-202413 A | | 9/2009 | |
| JP | 5296917 B1 | | 8/2013 | |
| JP | 2014-162851 A | | 9/2014 | |
| JP | 2015-120835 A | | 7/2015 | |
| JP | 2015-208893 A | | 11/2015 | |
| JP | 2015208893 A | * | 11/2015 | |
| JP | 2016-121327 A | | 7/2016 | |
| JP | 2016-121354 A | | 7/2016 | |
| JP | 6100022 A | | 3/2017 | |
| WO | 2007/060990 A1 | | 5/2007 | |
| WO | WO-2014069410 A1 | * | 5/2014 | ............ B32B 27/08 |
| WO | 2014/126079 A1 | | 8/2014 | |
| WO | 2015/146893 A1 | | 10/2015 | |
| WO | WO-2016024548 A1 | * | 2/2016 | ............... B29B 7/88 |
| WO | WO-2016047165 A1 | * | 3/2016 | ............ C08F 212/08 |
| WO | WO-2016194962 A1 | * | 12/2016 | ......... B01D 67/0025 |
| WO | WO-2017086215 A1 | * | 5/2017 | ............ C08F 220/18 |
| WO | WO-2017086466 A1 | * | 5/2017 | ............ C08F 220/06 |

OTHER PUBLICATIONS

Supplementary European Search Report issued in corresponding European Patent Application No. 18851251.1 dated Aug. 18, 2020.
International Search Report issued in corresponding International Patent Application No. PCT/JP2018/032496 dated Nov. 27, 2018.

* cited by examiner (a)

(b)

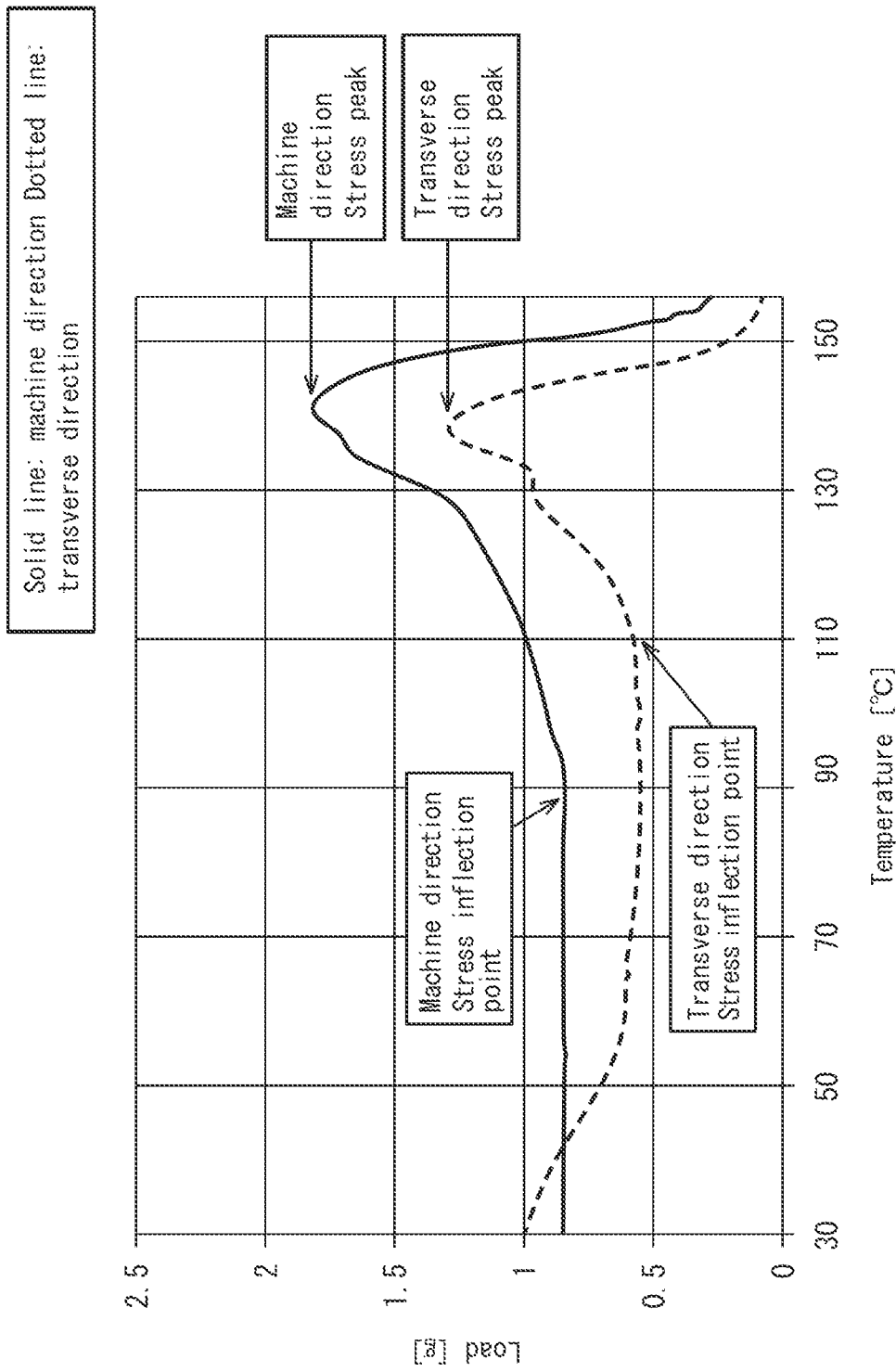

POLYOLEFIN MICROPOROUS MEMBRANE WITH IMPROVED PUNCTURE ELONGATION AND THERMOMECHANICAL PROPERTIES AND METHOD FOR MANUFACTURING THE SAME

FIELD

The present invention relates to a polyolefin microporous membrane and a method for manufacturing the same.

BACKGROUND

Polyolefin microporous membranes demonstrate superior electrical insulation characteristics and ion permeability, and, therefore, are used in battery separators, capacitor separators, fuel cell materials, microfiltration membranes, and particularly, lithium ion secondary battery separators. In recent years, lithium ion secondary batteries have been designed for use in cell phones, small electrical equipment in notebook computers, and electric vehicles such as electric automobiles and small electric bikes. Lithium ion secondary battery separators are required to have not only certain mechanical properties and ion permeability, but also a property wherein the micropores of the separator close due to thermofusion when the secondary battery gives off heat, thereby restricting the ion permeability within the electrolytic solution and stopping the electrochemical reaction (shut-down characteristics), and a property wherein the separator does not melt and rupture even when the internal temperature within the battery rises above the polyolefin melting point due to thermal runaway of the battery (melt-down resistant characteristics). In conjunction with the properties required of separators, the physical properties and manufacturing conditions of polyolefin microporous membranes were investigated (PTL 1 to 3).

From the perspective of stably and efficiently producing microporous membranes with superior balance of porosity, air permeability, mechanical strength, heat resistance, and shut-down characteristics, PTL 1 proposes manufacturing a microporous membrane by melt-kneading a polyolefin and a solvent, extruding the obtained melt-kneaded material from a die, forming a gel-like molded product by cooling, and subsequently biaxially stretching the molded product under the conditions that the stretch rate (strain rate) in the machine direction and the transverse direction are each not less than 85%/second, and then removing the solvent from the molded product. PTL 1 does not describe the strain rate during heat setting of the biaxially stretched membrane.

From the perspective of obtaining both dimensional stability and high rigidity, PTL 2 proposes a biaxially-oriented polypropylene film in which the puncture strength is adjusted to not less than 70 g/μm, and the heat shrinkage rate in the transverse direction when the film has undergone heat treatment of 120° C. for 15 minutes is adjusted to not more than 1.0%. PTL 2 describes that the puncture elongation of the biaxially-oriented polypropylene film is preferably adjusted to not less than 2.0 mm because when the puncture elongation is less than 2.0 mm, if foreign matter enters a capacitor containing the film, the foreign matter can easily penetrate the film, resulting in a short circuit, such that there is a capacity decrease or a short break.

From the perspective of producing a microporous membrane with superior anti-curling properties, PTL 3 proposes that a secondary stretching step performed after the extraction in the manufacturing process is composed of a stretching step of two or more stages, and the strain rate in a stretching step of the second or later stage is larger than the strain rate in the previous stage.

CITATION LIST

Patent Literature

[PTL 1] Japanese Unexamined Patent Publication (Kokai) No. 2005-209452
[PTL 2] WO 2015/146893
[PTL 3] Japanese Unexamined Patent Publication (Kokai) No. 2016-121354

SUMMARY

Technical Problem

In recent years, safety that accounts for more complicated conditions has become required of lithium ion secondary batteries as they have higher capacities and greater energy densities. In particular, there is a need for suppressing the chain reaction heating phenomenon (thermal runaway) of batteries caused by foreign matter in the battery or deformation of the outer casing. However, the microporous membrane produced according to the method described in PTL 1 merely aims to improve manufacturability while maintaining a balance of multiple physical properties, and has not been investigated in terms of suppressing thermal runaway when incorporated into a lithium ion secondary battery.

The biaxially-oriented polypropylene film described in PTL 2 prevents penetration by foreign matter, short circuits, etc., by adjusting the puncture strength or puncture elongation to higher than a specific standard value, but there remains room for improvement regarding suppression of secondary battery thermal runaway.

The method of manufacturing described in PTL 3 can produce a membrane with excellent anti-curling properties, but since this method cannot control puncture elongation, there is room for improvement regarding resistance to foreign matter.

Up to this point, microporous membranes for preventing thermal runaway caused by the introduction of foreign matter have been developed. For example, regarding microporous membranes which have the merit of a high puncture elongation as an anti-foreign matter characteristic, when the microporous membrane incurs an impact greater than the wear resistance of the microporous membrane and the membrane is penetrated by foreign matter, since the portion of the microporous membrane around the foreign matter is less likely to rupture, electrical current flows only through the foreign matter, and there is a danger that either the electrodes will not come into contact, or even if they do come into contact, the contact area is small, and a sufficient region for current to flow cannot be obtained, and therefore, the current becomes concentrated in one region, and the surface temperature of the battery rises. Therefore, the conventional microporous membranes with high puncture elongation have the effect of preventing thermal runaway by stopping puncture of the membrane, but are insufficiently effective at stopping thermal runaway once the microporous membrane has been punctured.

Out of consideration of the above circumstances, a problem to be solved by the present invention is to provide a polyolefin microporous membrane capable of suppressing thermal runaway of a secondary battery, and a secondary battery separator using the same.

Another problem to be solved by the present invention is to provide a polyolefin microporous membrane having excellent anti-curling properties even when an inorganic coating layer is provided, and a secondary battery separator using the same.

Solution to Problem

The present inventors discovered that the above problems can be solved by specifying a puncture elongation and a thermomechanical analysis profile of a polyolefin microporous membrane, or by specifying manufacturing conditions for a polyolefin microporous membrane, thereby completing the present invention. Essentially, the present invention is as follows:

[1]
A polyolefin microporous membrane having a puncture elongation of not more than 2.30 mm, a temperature at the stress inflection point of not less than 80.0° C., and a stress peak value of not more than 1.8 g in thermomechanical analysis (TMA) measurement of the transverse direction.

[2]
The polyolefin microporous membrane according to [1] wherein the puncture elongation is not more than 2.10 mm, the temperature at the stress inflection point is not less than 90.0° C., and the stress peak value is not more than 1.4 g in the TMA measurement of the transverse direction.

[3]
The polyolefin microporous membrane according to [1] or [2] wherein the stress peak value is not more than 2.0 g in the TMA measurement of the machine direction.

[4]
The polyolefin microporous membrane according to any one of [1] to [3] wherein the puncture strength per unit thickness is less than 70 gf/μm.

[5]
The polyolefin microporous membrane according to any one of [1] to [4] wherein the puncture elongation is not less than 0.5 mm, the temperature at the stress inflection point is not more than 180.0° C., the stress peak value is not less than 0.3 g in the TMA measurement of the transverse direction.

[6]
The polyolefin microporous membrane according to any one of [1] to [5] wherein the stress peak value is not less than 0.3 g in TMA measurement of the machine direction.

[7]
The polyolefin microporous membrane according to any one of [1] to [6] wherein the puncture strength per unit thickness is not less than 10 gf/μm.

[8]
A method for manufacturing a polyolefin microporous membrane comprising the following steps:
  (A) extruding a polyolefin composition comprising a polyolefin resin and a pore-forming material to form a gel-like sheet;
  (B) biaxially stretching the gel-like sheet to form a stretched sheet;
  (C) extracting the pore-forming material from the stretched sheet to form a porous membrane; and
  (D) heat setting the porous membrane; wherein
the strain rate in the machine direction in step (B) is not less than 20%/second and not more than 50%/second, and the ratio of strain rate in the transverse direction in step (B) to the strain rate in the transverse direction in step (D) is not less than 2.0 and not more than 10.0.

[9]
The method for manufacturing a polyolefin microporous membrane according to [8], wherein in step (B), the gel-like sheet is simultaneously biaxially stretched.

[10]
The method for manufacturing a polyolefin microporous membrane according to [8] or [9], wherein the obtained polyolefin microporous membrane has a puncture elongation of not more than 2.30 mm, a temperature at the stress inflection point of not less than 80.0° C., and a stress peak value of not more than 1.8 g in thermomechanical analysis (TMA) measurement of the transverse direction.

[11]
The method of manufacturing a polyolefin microporous membrane according to any one of [8] to [10], wherein the obtained polyolefin microporous membrane has a puncture elongation of not less than 0.5 mm, a temperature at the stress inflection point of not more than 180.0° C., a stress peak value of not less than 0.3 g in thermomechanical analysis (TMA) measurement of the transverse direction.

Advantageous Effects of Invention

Thermal runaway of a lithium ion secondary battery can be suppressed according to the present invention.

According to the present invention, in the case that foreign matter has been introduced into the secondary battery during an impact test, the foreign matter definitively penetrates the polyolefin microporous membrane, and the area of contact between the electrodes immediately after impact is increased thereby, such that local current density can be prevented, thereby improving the manufacturability and safety of secondary batteries. Additionally, even in the case of an extremely light impact, whereby the polyolefin microporous membrane near the foreign matter is not sufficiently ruptured, and the battery temperature rises because of insufficient contact area between the electrodes, the thermal resistance of the microporous membrane is excellent, such that the shrinkage of the microporous membrane associated with a rise in the surface temperature of the battery can be prevented, whereby the contact area between the electrodes can be prevented from becoming larger than when the battery receives an extremely light impact, and thermal runaway of the battery can be prevented.

According to the present invention, even if the temperature of the secondary battery increases due to the occurrence of a short circuit caused by a factor other than an impact, since the thermal shrinkage of the polyolefin microporous membrane is small, expansion of the area of contact between the electrodes can be suppressed, thus contributing to the safety of the secondary battery.

Further, according to the present invention, when polyolefin microporous membrane is used as a substrate, and a coating is applied to the substrate and dried, a balance of heat shrinkage of the substrate and thermal shrinkage of the coating layer can be achieved, such that even if coating speed and drying temperature are increased, it is possible to suppress curling of a coating film, thus improving the manufacturing speed of the secondary battery separator and the manufacturability of the secondary battery.

BRIEF DESCRIPTION OF DRAWINGS

FIG. 3 is a graph representing the TMA profile of the polyolefin microporous membrane obtained in Example 1.

DESCRIPTION OF EMBODIMENTS

The embodiments of the present invention (hereinafter referred to as "embodiments") will be described in detail below. However, the present invention is not limited to the embodiments below, but may be realized in various forms within the range thereof <Polyolefin Microporous Membrane>

One aspect of the present invention relates to a polyolefin microporous membrane. The polyolefin microporous membrane has ion permeability when it comprises an electrolytic solution, has high resistance to organic solvents, and preferably has a small pore size. Additionally, the polyolefin microporous membrane can be used as a secondary battery separator.

The polyolefin microporous membrane according to a first embodiment has a puncture elongation of not more than 2.30 mm, and in thermomechanical analysis (TMA) measurement in the transverse direction, the temperature of the stress inflection point is not less than 80.0° C., and the stress peak value is not more than 1.8 g.

In the present specification, machine direction (MD) refers to the direction of microporous membrane continuous formation by a machine, and transverse direction (TD) refers to the direction that crosses the machine direction of the microporous membrane at an angle of 90° on a plane of the membrane.

Additionally, in the present specification, thermal runaway refers to the phenomenon of chain reaction heating of secondary batteries.

Without being bound to theory, when a separator gets punctured due to foreign matter entering a secondary battery comprising the separator, it is considered that the greater the area of contact between the electrodes at the instant of impact, the smaller the danger of thermal runaway.

According to the present invention, when foreign matter has been introduced into a secondary battery during an impact test, the foreign matter definitively penetrates the polyolefin microporous membrane, and contact area between the electrodes can be sufficiently attained at the moment of impact, whereby local current density can be averted, such that the safety of secondary batteries can be improved. Additionally, even in the case that if the impact is extremely small, immediately after impact (for example, 3 seconds after impact), the polyolefin microporous membrane near the foreign matter is not sufficiently punctured, the contact area between the electrodes is insufficient, and the battery temperature rises, but since the thermal resistance of the microporous membrane is excellent, the shrinkage of the microporous membrane that occurs during a rise in battery temperature can be prevented, and after a certain duration (for example, 3 minutes after impact), the contact area between electrodes does not expand to more than the case of an extremely light impact, such that thermal runaway of the battery can be prevented.

Figure 1:
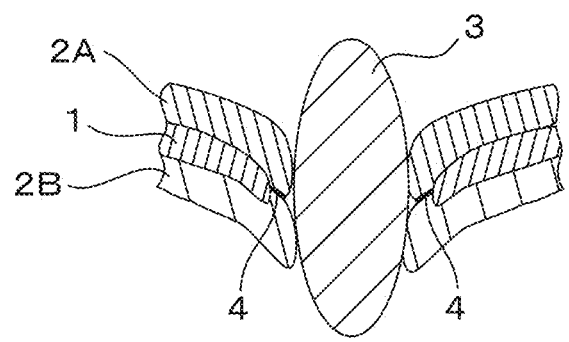
FIG. 1(a) is a pattern diagram for the purpose of describing the electrode contact area when a conventional separator is ruptured.
FIG. 1(b) is a pattern diagram for describing the electrode contact area when the separator in Example 1 is ruptured.
Figure 1:
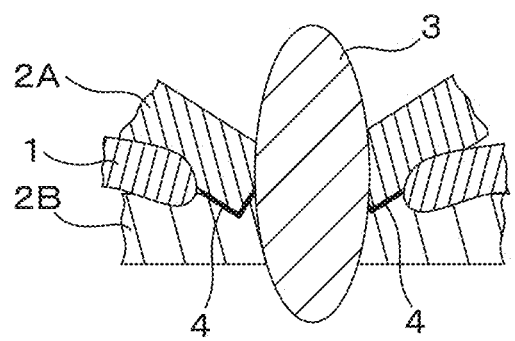

In FIG. 1, a conventional separator and a separator of the first embodiment are compared with regards to the electrode contact area during a membrane rupture. The relationship between electrode contact area at the time of a membrane rupture and occurrence of thermal runaway will explained with reference to FIG. 1.

If the separator (1) readily tracks the movement of the foreign matter (3), the separator (1) extends in the direction of foreign matter (3) movement, for example, in the direction of lamination of the separator (1) and electrode plates (2A, 2B), such that during the rupture of the separator, the area of contacted portions (4) of the electrode plates (2A, 2B) is small, and current accumulates in one point, whereby thermal runaway can easily occur (FIG. 1(a)).

If the separator (1) does not readily track the movement of the foreign matter (3), the separator (1) gets punctured immediately after the foreign matter (3) enters the battery, and the area of contacted portions (4) of the electrode plates (2A, 2B) becomes larger, and current accumulation in one point can be suppressed (FIG. 1(b)).

Therefore, particularly for suppressing thermal runaway due to introduction of foreign matter, it is important to suppress the tracking of the separator relative to the foreign matter such that immediately after the separator has ruptured, the contact area between the positive and negative electrodes is as large as possible. From the foregoing perspective, the structure of a polyolefin microporous membrane having the proper tracking relative to foreign matter at the time of rupture is specified by the following (i) and (ii):

(i) puncture elongation (mm) 2.30;
(ii) in TMA measurement in the transverse direction, the temperature of the stress inflection point (° C.) ≥80.0, and the stress peak value (g) ≤1.8.

[Puncture Test Characteristics]

In the present specification, puncture elongation refers to the moving distance (elongation) of a needle of a specific size from a position where the needle has come into contact with a membrane test piece to a position where a hole is opened, wherein the periphery of a membrane test piece is secured and wherein the needle pierces the membrane test piece from the outer surface thereof in the thickness direction. Puncture strength refers to the stress on a test piece relative to a force exerted by piercing the membrane test piece from the outer surface thereof in the thickness direction using a needle of a specific size. The measurement methods of the puncture elongation and puncture strength are described in the example section.

If the polyolefin microporous membrane has a puncture elongation of not more than 2.30 mm, it tends to demonstrate foreign matter tracking properties and rupture behavior suitable for suppression of thermal runaway.

Conventionally, in the case that foreign matter was introduced into the secondary battery during an impact test of a secondary battery which comprised a polyolefin microporous membrane, there was the tendency that, if the elongation of the polyolefin microporous membrane was high, the membrane would track with the foreign matter and elongate, such that contact area between electrodes could not be sufficiently achieved, and local charge concentration occurred, whereby the battery would ignite, and safety would decrease. Additionally, when conventionally developed microporous membranes with high puncture elongation were slightly ruptured by an unexpectedly large impact, the contact area of the electrodes could not be sufficiently achieved such that local charge concentration occurred more readily, and sufficient safety could not be achieved.

In contrast, in the first embodiment, since the polyolefin microporous membrane has a puncture elongation of not more than 2.30 mm, in the secondary battery impact test, the contact area between the electrodes can be sufficiently achieved at the moment of impact when foreign matter definitively penetrates the polyolefin microporous membrane, and concentration of current can be prevented, such that the safety and manufacturability of secondary batteries is improved.

From the perspective of suppressing thermal runaway of secondary batteries and suppressing curling of the coating layer, a puncture elongation of not more than 2.30 mm was selected as the index for choosing a polyolefin starting material and forming a polyolefin microporous membrane. From a similar perspective, the upper limit of the puncture elongation is preferably not more than 2.20 mm, or more preferably not more than 2.10 mm, and the lower limit of the puncture elongation is preferably more than 0 mm, or not less than 0.5 mm, more preferably not less than 1.5 mm, even more preferably not less than 1.6 mm, and most preferably not less than 1.7 mm.

The puncture elongation, as stated above, can be adjusted according to, for example, selection of an olefin starting material for creating the microporous membrane, or restricting the strain rate at the time of elongation and/or the time of heat setting of the polyolefin composition.

From the perspective of suppressing thermal runaway of the secondary battery, suppression of curling of the coating layer, and preventing the introduction of foreign matter into the separator, the puncture strength per unit thickness of the polyolefin microporous membrane is preferably less than 70 gf/μm, more preferably not less than 10 gf/μm and less than 70 gf/μm, even more preferably not less than 20 gf/μm and not more than 60 gf/μm, even more preferably not less than 25 gf/μm and not more than 55 gf/μm, or most preferably not less than 30 gf/μm and not more than 55 gf/μm.

The absolute puncture strength of the polyolefin microporous membrane is, from the perspective of insulation reliability and handleability, preferably not less than 50 g, and from the perspective of not hindering the definitive penetration of the polyolefin microporous membrane by foreign matter in an impact test of a secondary battery, is preferably not more than 400 g. More preferably, the absolute puncture strength of the polyolefin microporous membrane is not less than 100 g and not more than 350 g.

The basis weight of the polyolefin microporous membrane is, from the perspective of demonstrating shut-down characteristics, preferably not less than 2 g/m$^2$, and from the perspective of ion permeability and battery capacity, is preferably not more than 20 g/m$^2$. More preferably, the basis weight of the polyolefin microporous membrane is not less than 3 g/m$^2$ and not more than 10 g/m$^2$.

[TMA Measurement]

In the present specification, thermomechanical analysis (TMA) is performed in constant length mode to detect mechanical characteristics relative to the heat of a test piece. In constant length mode, changes in load required to maintain the test piece at a constant length in accordance with changes in the test piece temperature are detected.

In constant length mode, when the test piece begins to contracts due to heating, the test piece is pulled with a load placed on the test piece to ensure that the length of the test piece (essentially, the distance between chucks) remains the same as before heating. TMA in constant length mode is performed continuously from the start of rise in temperature of the test piece until rupture of the test piece. While applying a load to the test piece with a probe from the load generation portion, the temperature of the test piece is changed by a heater, whereby, in accordance with the changing temperature of the test piece, the changes in load required to maintain a constant length of the test piece can be detected, and from the detected TMA profile, the softening point, thermal expansion behavior, and thermal shrinkage behavior of the test piece can be determined. TMA measurement is performed in accordance with the method described in the Examples.

On the temperature (° C.)-load (g) curve of the TMA profile in constant length mode, the stress inflection point is the point when the slope of the curve first inverts after the start of heating. The slope of the curve after the start of heating is maintained as zero (0) and fluctuations within range of ±0.07 g for the load as noise immediately after the start of rising temperature are not included in the stress inflection point. In the present technical field, the temperature of the stress inflection point is viewed as the temperature at which thermal shrinkage of the polyolefin microporous membrane starts. Additionally, in general, the separator receives tension in the machine direction within the battery, and does not receive tension in the transverse direction, and therefore it is expected that, in the case that thermal runaway of the battery occurs, shrinkage in the transverse direction is more likely to occur before shrinkage in the machine direction. Therefore, in the first embodiment, as an index for selecting a thermal shrinkage initiation temperature suitable for suppressing thermal runaway of a secondary battery, a temperature of the stress inflection point in the transverse direction was determined to be not less than 80.0° C.

On the temperature (° C.)-load (g) curve of the TMA profile in constant length mode, the stress peak is the point representing the maximum load and the stress peak value is the maximum load. Additionally, regarding the TMA profile in constant length mode, the shape of the curve including the stress peak changes in accordance with strength, residual stress, melting point, and the like. In the first embodiment, as an index for selecting melting initiation temperature and thermal shrinkage rate suitable for suppressing thermal runaway of a secondary battery, a stress peak value in the transverse direction was determined to be not more than 1.8 g.

Additionally, if a conventional polyolefin microporous membrane is used as a substrate, and a coating liquid such as a water-based paint is applied to the substrate, the drying temperature needed to dry the water-based paint increases as the coating rate increases, such that, as a result, the balance of substrate shrinkage and coating layer shrinkage is poor, and the coating film curls. In contrast, in the first embodiment, by using a polyolefin microporous membrane having a temperature of a stress inflection point of not less than 80.0° C. and a stress peak value of not more than 1.8 g in a TMA profile in the transverse direction as a substrate, when the coating liquid is dried after being applied to the substrate, the balance of substrate shrinkage and coating layer thermal shrinkage is good, and curling of the coating layer can be suppressed even if the coating rate or drying temperature is increased, such that the manufacturing speed of secondary battery separators and the manufacturability of secondary batteries can be improved.

From the perspective of suppressing thermal runaway, safety during impact tests of secondary batteries, and manufacturability of secondary batteries, the temperature of the stress inflection point in the TMA measurement in the transverse direction is preferably not less than 80° C., or more than 80° C. and not more than 180° C., more preferably not less than 90.0° C. and not more than 150.0° C., even more preferably not less than 100.0° C. and not more than 140.0° C., or most preferably more than 100.0° C. and not more than 130.0° C., and the stress peak value is preferably not more than 1.8 g, more preferably not more than 1.4 g, even more preferably not less than 0.3 g and not more than 1.4 g, and most preferably not less than 1.0 g and not more than 1.4 g.

Additionally, from the perspective of thermal stability, the stress peak value in the TMA measurement in the machine direction of the polyolefin microporous membrane is preferably not more than 2.0 g, more preferably not less than 0.3 g and not more than 1.9 g.

By controlling the type and amount of polyolefin starting material, and elongation conditions and heat setting conditions of the polyolefin composition, the TMA behavior of the polyolefin microporous membrane can be controlled to within (i) and (ii) above.

[Relationship Between Puncture Elongation and TMA Behavior]

The polyolefin microporous membrane of the first embodiment has a puncture elongation of not more than 2.30 mm and demonstrates the TMA behavior indicated in (i) and (ii) above, and by balancing the puncture elongation and the TMA behavior, even if, for example, the surface temperature of the battery rises due to a short circuit caused by a factor other than an impact, since the thermal shrinkage of the polyolefin microporous membrane is small, the expansion of the area of contact between the electrodes can be restricted, and the safety can be synergistically improved.

[Compositional Elements]

Compositional elements and preferred embodiments of the polyolefin microporous membrane will be explained below.

The polyolefin microporous membrane can be, for example, a porous membrane comprising a polyolefin resin, a porous membrane containing a resin such as polyethylene terephthalate, polycycloolefin, polyether sulfone, polyamide, polyimide, polyimide amide, polyaramid, polycycloolefin, nylon, or polytetrafluoroethylene, a fabric woven of polyolefin-based fibers (woven fabric), or a non-woven fabric of polyolefin-based fibers. In particular, from the perspective of excellent coating properties of the coating liquid when obtaining a multilayer porous membrane through a coating step, i.e. when obtaining a secondary battery separator; obtaining a membrane thickness of the separator that is thinner than conventional standards; and increasing the capacity per volume by raising the percentage of activated substances within the electrical storage device of the secondary batteries, a porous membrane comprising a polyolefin resin (hereinafter referred to as "polyolefin resin porous membrane") is preferable.

The polyolefin resin porous membrane will be explained.

From the perspective of improving shut-down characteristics at the time of forming a secondary battery separator, the polyolefin resin porous membrane is preferably a porous membrane formed from a polyolefin resin composition in which a polyolefin resin constitutes not less than 50 weight % and not more than 100 weight % of the resin components of the porous membrane. The percentage of the polyolefin resin in the polyolefin resin composition is preferably not less than 60 weight % and not more than 100 weight %, more preferably not less than 70 weight % and not more than 100 weight %, or most preferably not less than 95 weight % and not more than 100 weight %.

The polyolefin resin contained in the polyolefin resin composition is not particularly limited, and can be, for example, a homopolymer, a copolymer, or a multi-stage polymer obtained using ethylene, propylene, 1-butene, 4-methyl-1-pentene, 1-hexene, or 1-octene as a monomer. Additionally, these polyolefin resins can be used individually or as a mixture of two or more thereof.

In particular, from the perspective of shut-down characteristics at the time of forming a secondary battery separator, the polyolefin resin is preferably polyethylene, polypropylene, an ethylene-propylene copolymer, an ethylene-propylene copolymer with another different monomer, or a mixture thereof.

Specific examples of polyethylene include low density polyethylene, linear low density polyethylene, medium density polyethylene, high density polyethylene, and ultra high molecular weight polyethylene.

Specific examples of polypropylene include isotactic polypropylene, syndiotactic polypropylene, and atactic polypropylene.

Specific examples of the copolymer include ethylene-propylene random copolymers and ethylene-propylene rubbers.

From the perspective of further improving shut-down characteristics at the time of forming a secondary battery separator, the polyolefin resin porous membrane is preferably a porous membrane formed from a polyethylene composition in which polyethylene constitutes not less than 50 weight % and not more than 100 weight % of the resin components of the porous membrane. The percentage of the polyethylene in the resin components constituting the porous membrane is preferably not less than 60 weight % and not more than 100 weight %, more preferably not less than 70 weight % and not more than 100 weight %, or most preferably not less than 95 weight % and not more than 100 weight %.

From the perspective of halting thermal runaway of the battery in the early stages, the polyolefin resin is preferably polyethylene which has a melting point within the range of 130° C. to 150° C. The percentage of polyethylene in polyolefin resin is preferably not less than 50 weight %, more preferably not less than 70 weight %, or even more preferably not less than 80 weight %, and preferably not more than 100 weight %, more preferably not more than 97 weight %, or even more preferably not more than 95 weight %.

In particular, from the perspective of achieving the shut-down characteristics and desired high strength at the time of forming a secondary battery separator, the polyolefin resin is preferably polyethylene, particularly, high density polyethylene. In the present invention, high density polyethylene refers to polyethylene with a density of 0.942 to 0.970 g/cm$^3$. Furthermore, in the present invention, the density of polyethylene is the value measured according to D) Density Gradient Tube Method in JIS K7112 (1999).

From the perspective of improving the heat resistance of the porous membrane, the polyolefin resin can be a mixture of polyethylene and polypropylene. In this case, the percentage of polypropylene in the polyolefin resin composition relative to the total amount of polyolefin resin is, from the perspective of achieving both good heat resistance and good shut-down characteristics, preferably 1 to 40 weight %, more preferably 2 to 30 weight %, or most preferably 3 to 20 weight %.

Any additives can be added to the polyolefin resin composition. Examples of the additives include polymers other than polyolefin resins; inorganic filler; anti-oxidants such as phenols, phosphorous-containing substances, and sulfur-containing substances; metal soaps such as calcium stearate, and zinc stearate; ultraviolet absorbers; photostabilizer; anti-static agents; antifogging agents; and color pigments. The total amount of these additives relative to 100 weight % of the polyolefin resin, is, from the perspective of improving shut-down characteristics, preferably not more than 20 weight %, more preferably not more than 10 weight %, or most preferably not more than 5 weight %.

[Details of the Microporous Membrane]

Since the polyolefin microporous membrane has a porous structure formed by intricately connected pores due to a collection of extremely small pores, it features extremely excellent ion permeability as well as voltage resistance characteristics when containing an electrolytic solution, and furthermore, has high strength. The microporous membrane may be a single layer membrane comprising one of the above materials, or may be a laminate.

The membrane thickness of the microporous membrane is preferably not less than 1 µm and not more than 100 µm, more preferably not less than 1 µm and not more than 50 µm, even more preferably not less than 2 µm and not more than 25 µm, or most preferably not less than 2 µm and not more than 11 µm. The membrane thickness of the microporous membrane is, from the perspective of mechanical strength, preferably not less than 1 µm and from the perspective of achieving a high capacity secondary battery, preferably not more than 100 µm. The membrane thickness of the microporous membrane can be adjusted by controlling the stretch ratio in the stretching stage or the die lip spacing.

The average pore size of the microporous membrane is preferably not less than 0.01 µm and not more than 0.70 µm, more preferably not less than 0.02 µm and not more than 0.20 µm, even more preferably not less than 0.03 and not more than 0.10 µm, and most preferably not less than 0.04 µm and not more than 0.09 µm. From the perspective high ion permeability and voltage resistance, an average pore size of not less than 0.01 µm and not more than 0.70 µm is preferable. The average pore size of the microporous membrane can be measured according to the measurement method described in, for example, Japanese Unexamined Patent Publication (Kokai) No. 2017-27945.

The average pore size can be adjusted by controlling the composition ratios, cooling rate of the extrusion sheet, stretch temperature, stretch ratio, heat setting temperature, stretch ratio at the time of heat setting, or relaxation rate at the time of heat setting, or a combination thereof.

The porosity of the microporous membrane is preferably not less than 25% and not more than 95%, more preferably not less than 30% and not more than 65%, or most preferably not less than 35% and not more than 55%. The porosity of the microporous membrane is, from the perspective of improved ion permeability, preferably not less than 25%, and from the perspective of voltage resistance characteristics, preferably not more than 95%.

The porosity of the microporous membrane can be adjusted by controlling the mixture ratio of polyolefin resin composition and plasticizer, stretch temperature, stretch ratio, heat setting temperature, stretch ratio at the time of heat setting, and relaxation rate at the time of heat setting, or a combination thereof.

In the case that the microporous membrane is a polyolefin resin porous membrane, the viscosity average molecular weight (Mv) of the polyolefin resin used as a starting material is preferably not less than 30,000 and not more than 5,000,000, more preferably not less than 80,000 and less than 3,000,000, or most preferably, not less than 150,000 and less than 2,000,000. If the viscosity average molecular weight is not less than 30,000, the formability during melt forming is good, and strength tends to be higher due to tangling of polymers, which is preferable. If the viscosity average molecular weight is not more than 5,000,000, the melt kneading is easy to keep homogenous, and sheet formability characteristics, particularly stability, tend to be good, which is preferable. Furthermore, if the viscosity average molecular weight is less than 1,000,000 when the secondary battery separator is formed, the pores close easily when the temperature rises, and shut-down characteristics tend to be good, which is preferable.

The polyolefin microporous membrane of the first embodiment can be manufactured according to the method for manufacturing polyolefin microporous membranes comprising the steps (A) to (D) described below, as an example of the method of manufacture.

<Method for Manufacturing the Polyolefin Microporous Membrane>

Another aspect of the present invention provides a method for manufacturing a polyolefin microporous membrane. The method of manufacturing a polyolefin microporous membrane according to the second embodiment comprises the following steps:

(A) extruding a polyolefin composition comprising polyolefin resin and pore-forming material to form a gel-like sheet;

(B) biaxially stretching the gel-like sheet to form a stretched sheet;

(C) extracting the pore-forming material from the stretched sheet to form a porous membrane; and (D) heat setting the porous membrane.

In the second embodiment, the strain rate of the machine direction in step (B) is not less than 20%/second and not more than 50%/second, and the ratio of strain rate of the transverse direction in step (B) relative to the strain rate of the transverse direction in step (D) is not less than 2.0 and not more than 10.0.

The steps of manufacturing a polyolefin microporous membrane and preferred embodiments will be described below.

[Extruding Step (A)]

In step (A), a polyolefin composition is extruded and a gel-like sheet is formed. The polyolefin composition may comprise a polyolefin resin, a pore-forming agent, or the like. The gel-like sheet can be obtained by melt-kneading the polyolefin resin and pore-forming agent to form a gel.

First, the polyolefin resin and pore-forming agent are melt-kneaded. The melt-kneading method may be, for example, inserting a polyolefin resin with any necessary additives into resin kneading equipment such as an extruder, kneader, Laboplast mill, kneading roll, or Banbury mixer, then introducing a pore-forming agent in any desired ratio while heat-melting the resin component, and kneading the mixture.

The polyolefin resin contained in the polyolefin composition can be determined based on the specific resin starting material of the polyolefin microporous membrane to be obtained. Specifically, the polyolefin resin used in the extruding step (A) can be any of the polyolefin resins described in connection with the polyolefin microporous membrane according to the first embodiment.

The percentage of polyolefin resin in the polyolefin composition is, from the perspective of sheet formability, based on the weight of the polyolefin composition, preferably 10 to 80 weight %, more preferably 20 to 60 weight %, or most preferably 30 to 50 weight %.

The pore forming agent may be a plasticizer, an inorganic material or a combination thereof. The plasticizer is not particularly limited, but preferably uses a nonvolatile solvent which can form a homogenous solution at and above the melting point of the polyolefin. Specific examples of the nonvolatile solvent include hydrocarbons such as liquid paraffin and paraffin wax; esters such as dioctyl phthalate and dibutyl phthalate; and higher alcohols such as oleyl alcohol and stearyl alcohol. Additionally, these plasticizers may be recovered after extrusion through operations such as distillation, and reused.

Among these plasticizers, liquid paraffin is preferable, when the polyolefin resin is polyethylene and polypropylene, because liquid paraffin has high compatibility with polyethylene and polypropylene, and thus, boundary separation between the resin and the plasticizer occurs less readily even when the melt-kneaded mixture is stretched, such that there is a tendency that homogenous stretching is more easily performed.

The ratio of polyolefin resin composition and plasticizer can be determined in accordance with the homogenous melt-kneading and sheet formability. The weight fraction of the plasticizer in the composition consisting of the polyolefin resin composition and the plasticizer is preferably 20 to 90 weight %, or more preferably 50 to 70 weight %. If the weight fraction of the plasticizer is not more than 90 weight %, the melt tension at the time of melt forming tends to be sufficient for improving formability. If the weight fraction of the plasticizer is not less than 20 weight %, even when the mixture of polyolefin resin composition and plasticizer is stretched at a high ratio, the polyolefin molecular chains do not break, a homogenous and fine porous structure is easily formed, and strength improves.

The inorganic material is not particularly limited, but may be, for example, oxide ceramics such as alumina, silica (silicon oxides), titania, zirconia, magnesia, ceria, yttria, zinc oxide, and iron oxide; nitride ceramics such as silicon nitride, titanium nitride, boron nitride; ceramics such as silicon carbide, calcium carbide, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth, and silica sand; and glass fiber. The above can be used individually or as a mixture of two or more thereof. Silica is particularly preferable from the perspective of ease of extrusion.

The ratio of polyolefin resin composition and inorganic material is, from the perspective of obtaining good isolation, relative to the total weight, the inorganic material is preferably not less than 5 weight %, more preferably not less than 10 weight %, and from the perspective of obtaining high strength, is preferably not more than 99 weight %, or more preferably not more than 95 weight %.

Next, the melt-kneaded mixture is formed into a sheet to obtain a gel-like sheet. The method of manufacturing a sheet-like formed body can be performed by, for example, extruding the melt-kneaded mixture through a T-die or the like into a sheet, and cooling the sheet to a temperature sufficiently lower than the crystallization temperature of the resin by contacting the sheet with a thermally conductive body, thereby solidifying the sheet. The thermally conductive body to be used in cooling solidification may be metal, water, air, a plasticizer or the like. In particular, using a metal roller is preferable because of its high thermal conductivity. Additionally, when contacting the extruded gel-like sheet with the metal roller, pinching the sheet between rollers further improves the efficacy of the thermal conductivity, while increasing the membrane strength by orienting the sheet, and tends to improve the smoothness of the surface, which is preferable. The die lip spacing when extruding the melt-kneaded mixture through a T-die is preferably not less than 200 μm and not more than 3,000 μm, or more preferably, not less than 500 μm, and not more than 2,500 μm. If the die lip spacing is not less than 200 μm, gum is reduced, there is little effect on the membrane quality, such as streaks and holes, such that the risk of membrane rupture in the subsequent stretching step is reduced. If the die lip spacing is not more than 3,000 μm, cooling speed is high and cooling unevenness can be prevented. Further, sheet thickness stability can be maintained.

The extruded sheet-like formed body of the gel-like sheet can be rolled. The rolling can be, for example, performed according to a method using a roller or the like. By performing rolling, the orientation of the surface part can particularly be increased. The rolling surface magnification is preferably more than 1 and not more than 3, or more preferably more than 1 and not more than 2. If the rolling magnification is more than 1, surface orientation increases and there is a tendency for the final porous membrane to have a higher membrane strength. If the rolling magnification is not more than 3, there is little difference in orientation between the surface part and the internal center part, and there is a tendency to form homogenous porous structures in the thickness direction of the membrane.

[Stretching Step (B)]

In step (B), the gel-like sheet or formed sheet is stretched. The step (B) may be performed before or after step (C) of extracting the pore-forming material from the sheet, or may be performed before and after step (C). In step (B), the stretching treatment of the gel-like sheet or formed sheet is performed at least one time in each of the machine direction and the transverse direction (i.e., biaxial stretching) from the perspective of reducing the membrane thickness distribution and the air permeability distribution in the transverse direction.

In step (B), the strain rate of the machine direction is within the range of 20%/second (inclusive) to 50%/second (inclusive). In the present description, strain rate refers to the rate of change per unit of time in a single direction of a body between from before a certain treatment is performed to after a certain treatment is performed, and is also called elongation ratio.

The strain rate in the transverse direction in step (B) is set such that the ratio of strain rate in the transverse direction in step (B) relative to the strain rate in the transverse direction in heat setting step (D) is not less than 2.0 and not more than 10.0.

In step (B), the sheet is stretched such that the strain rate in the machine direction is within the range of 20%/second (inclusive) to 50%/second (inclusive), and by stretching the sheet in the transverse direction at a strain rate higher than the strain rate in the transverse direction in the heat setting step (D), it becomes easier to control the physical properties of the obtained polyolefin microporous membrane, and a polyolefin microporous membrane that satisfies, for example, (i) and (ii) below:

(i) puncture elongation (mm) 2.30;
(ii) in TMA measurement in the transverse direction, the temperature of the stress inflection point (° C.) 80.0, and the stress peak value (g) 1.8;

can be manufactured, contributing to suppression of secondary battery thermal runaway. The reason is not entirely clear, but as the strain rate in the machine direction in step (B) increases, the stress peak value in the TMA measurement increase, and puncture elongation decrease. Also for unknown reasons, the higher the ratio of strain rate in the transverse direction in step (B) to that in step (D), the lower the stress peak value in the TMA measurement, and the higher the puncture elongation. From this perspective, in order to control the balance of puncture elongation and stress peak in the TMA measurement within the optimal range, the strain rate in the machine direction in step (B) is preferably in the range of 20%/second (inclusive) to 40%/second (inclusive), or more preferably 20%/second (inclusive) to 35%/second (inclusive), and the ratio of strain rate in the transverse direction in step (B) relative to the strain rate in the transverse direction in heat setting step (D) is preferably in the range of 2.0 (inclusive) to 6.0 (inclusive), or more preferably 2.5 (inclusive) to 5.0 (inclusive).

The method of biaxially stretching can be, for example, simultaneous biaxial stretching, sequential biaxial stretching, multistage stretching, or multiple stretching. In particular, from the perspective of limiting the number of times for cooling and heating, improving puncture strength and consistency of the stretch, simultaneous biaxial stretching is preferable.

Simultaneous biaxial stretching is a stretching method wherein stretching in the machine direction and stretching in the transverse direction are performed simultaneously, and the stretch ratios for these directions may be different. Sequential biaxial stretching is a stretching method wherein stretching in the machine direction and the transverse direction are performed independently, and when stretching is performed in the machine direction or the transverse, either an unrestrained state or a fixed-length state is maintained in the other direction.

The stretch ratio of step (B) is preferably in the range of 20 times to 100 times in terms of surface ratio, or more preferably in the range of 30 times to 70 times. Regarding the stretch ratio for each axial direction, 2 times to 12 times for the machine direction and 2 times to 12 times for the transverse direction is preferable, 3 times to 10 times for the machine direction and 3 times to 10 times for the transverse direction is more preferable, and 5 times to 8 times for the machine direction and 5 times to 8 times for the transverse direction is the most preferable. If the total area ratio is not less than 20 times, sufficient strength is imparted to the obtained porous membrane, and if the total area ratio is not more than 100 times, membrane rupture during stretching is prevented and high manufacturability is attained.

The stretch temperature of step (B) is, from the perspective of meltability and membrane-forming characteristics of the polyolefin resin is preferably 90 to 150° C., more preferably 100 to 140° C., or most preferably 110 to 130° C.

[Extraction Step (C)]

In step (C), the pore-forming material is removed from the sheet-like formed body to obtain a porous membrane. The method for removing the pore-forming material can be, for example, immersing the sheet-like formed body in an extraction solvent, extracting the pore-forming material and sufficiently drying. The method for extracting the pore-forming material can be a batch-type method or a continuous method. In order to limit shrinkage of the porous membrane, it is preferable to restrain an end of the sheet-like formed body during the sequence of steps of immersing and drying. Additionally, the amount of residual pore-forming material in the porous membrane is preferably less than 1 weight % relative to the total weight of the porous membrane.

The extraction solvent used for extraction of the pore-forming material is preferably a poor solvent of polyolefin resin, a good solvent of the pore-forming material, and has a boiling point lower than the melting point of the polyolefin resin. Examples of this extraction solvent include hydrocarbons such as n-hexane and cyclohexane; halogenated hydrocarbons such as methylene chloride, 1,1,1-trichloroethane; non-chlorinated halogenated solvents such as hydrofluoroether and hydrofluorocarbon; alcohols such as ethanol and isopropanol; ethers such as diethyl ether and tetrahydrofuran; ketones such as acetone and methyl ethyl ketone. These solvents can be collected by operations such as distillation and reused. Additionally, when an inorganic material is used as a pore-forming material, aqueous solutions of sodium hydroxide or potassium hydroxide can be used as the extraction solvent.

[Heat Setting Step (D)]

In step (D), in order to restrict the shrinkage of the porous membrane, heat treatment of the porous membrane for the purpose of heat setting is performed after the stretching step (B) or after the extraction step (C). Additionally, post-processing of the porous membrane, such as hydrophilization using a surfactant, or cross-linking treatment with ionizing radiation, may be performed.

The heat treatment of the porous membrane, for the purpose of adjusting physical characteristics, can be a stretching operation performed at a certain temperature in a certain atmosphere at a certain stretch ratio, and/or, for the purpose of reducing stretching stress, can be a relaxation operation performed at a certain temperature in a certain atmosphere at a certain relaxation rate. These heat treatments can be carried out using a tenter of roll stretching device.

The strain rate in the transverse direction in step (D) is set such that the ratio of strain rate in the transverse direction in stretch step (B) relative to the strain rate in the transverse direction in step (D) is in the range of 2.0 (inclusive) to 10.0 (inclusive). In step (D), by heat setting the porous membrane at a strain rate lower than the strain rate in the transverse direction in stretch step (B), the physical characteristics of the obtained polyolefin become easier to control, whereby, for example, the polyolefin microporous membrane of the first embodiment can be manufactured, contributing to the suppression of thermal runaway of secondary batteries. The calculation method for the ratio of the strain rate to strain rate will be described in the Examples hereinafter.

The stretching operation in step (D) is preferably performed by stretching the membrane in the machine direction and/or the transverse direction by not less than 1.1 times, or more preferably not less than 1.2 times, from the perspective of obtaining a porous membrane with higher strength and higher porosity.

The relaxation operation is a shrinkage operation in the machine direction and/or the transverse direction of the membrane. The relaxation rate is the value found by dividing the membrane dimensions after the relaxation operation by the membrane dimensions before the relaxation operation. The relaxation rate when both the machine direction and the transverse direction are relaxed is the value found by multiplying the relaxation rate in the machine direction by the relaxation rate in the transverse direction. The relaxation rate is preferably not more than 1.0, more preferably not more than 0.97, or even more preferably not more than 0.95. From the perspective of membrane quality, the relaxation rate is preferably not less than 0.5. The relaxation operation can be performed in both the machine direction and the transverse direction, or in either the machine direction or the transverse direction.

The heat setting which comprises stretching, a relaxation operation, and the like after extraction of plasticizer is preferably performed in the transverse direction. In this case, the heat setting rate in the transverse direction is preferably 0.5 to 2.5 times, more preferably 0.7 to 2.3 times, or even more preferably 1.0 to 2.0 times.

The temperature of heat setting which comprises stretching, a relaxation operation, and the like is, from the perspective of melting point of the polyolefin resin, preferably in the range of 100 to 170° C. If the temperature of stretching and the relaxation operation is within the above range, the balance of thermal shrinkage rate reduction and porosity is suitable. The lower limit for the heat setting temperature is preferably not less than 110° C., more preferably not less than 120° C., or most preferably not less than 125° C., and the upper limit is preferably not more than 170° C., more preferably not more than 160° C., even more preferably not more than 150° C., or most preferably not more than 140° C.

<Formation of the Inorganic Coating Layer>

From the perspective of safety, dimensional stability, and heat resistance, an inorganic coating layer can be provided on the surface of the polyolefin microporous membrane. The inorganic coating layer comprising an inorganic component such as inorganic particles, and can comprise a binder resin to mutually bind inorganic particles, a dispersant to disperse inorganic particles in the binder resin, and the like.

Examples of the inorganic particles include oxide ceramics such as alumina, silica, titania, zirconia, magnesia, ceria, yttria, zinc oxide, and iron oxide; nitride ceramics such as silicon nitride, titanium nitride, and boron nitride; ceramics such as silicon carbide, calcium carbonate, magnesium sulfate, aluminum sulfate, barium sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth, and silica sand; and glass fibers. The above can be used individually or as a mixture of two or more thereof.

The binder resin can be, for example, a conjugated diene polymer, acrylic polymer, polyvinyl alcohol resin, or fluorine-containing resin. Additionally, the binder resin can be in the form of latex and can comprise water or a water-based solvent. The dispersant adheres to the surface of inorganic particles in the slurry and stabilizes the inorganic particles through static electric repulsion, and is, for example, a polycarboxylate, sulfonate, polyoxyether, or surfactant.

The inorganic coating layer can be formed, for example, by applying the slurry of contained components described above to the surface of the polyolefin microporous membrane and then drying.

Additionally, an adhesive layer which exhibits adhesion towards electrodes can be provided in the polyolefin microporous membrane or the inorganic coating layer, and if an adhesive layer is provided, for example, deformation of laminated batteries can be suppressed.

<Secondary Battery Separator>

The polyolefin microporous membrane of the first embodiment or the polyolefin microporous membrane obtained by the manufacturing method of the second embodiment can be used as a secondary battery separator. By incorporating the separator into lithium ion secondary batteries, the separator can suppress thermal runaway of lithium ion secondary batteries.

The measured values of the above physical characteristics, unless indicated otherwise, are values measured in accordance with the measurement methods described in the Examples below.

EXAMPLES

The present embodiment will be specifically described using Examples and Comparative Examples, but the present embodiment is not limited thereto. The physical characteristics of the Examples are measured according to the following methods.

[Viscosity Average Molecular Weight]

The limiting viscosity $[\eta]$ (dl/g) at 135° C. in a decalin solution was found based on ASTM-D4020.

For polyethylene, the following value was calculated.

$$[\eta]=6.77\times10^{-4}Mv^{0.67}$$

For polypropylene, the following value was calculated.

$$[\eta]=1.10\times10^{-4}Mv^{0.80}$$

[Melting point (° C.)]

The melting point of polyolefin resin was measured using a differential scanning calorimeter (DSC) measuring device "DSC-60" (Shimadzu Corporation).

[Thickness of Each Layer (μm)]

Thickness at an ambient temperature of 23±2° C. was measured using a minor thickness gauge (Type KBN, terminal diameter Φ 5 mm) from Toyo Seiki Manufacturing Co. When measuring thickness, two microporous membranes were overlaid and measured, and the total thickness was divided by 2 for the thickness of one membrane.

[Porosity (%)]

Based on the weight, density, and thickness of the membrane, porosity was calculated using the following formula. Density was calculated using the material density.

Porosity=(1−(basis weight [g/m$^2$]/membrane thickness [μm]/density [kg/m$^3$]))×100

[Air Permeability (seconds/100 cc)]

Air permeability was measured using Oken type air permeability tester "EGO2" from Asahi Seiko Co., Ltd.

The measured value of the air permeability is the value calculated by measuring air permeability at points 5 cm from each edge in the transverse direction of the membrane and at the center point (total 3 points) and averaging those values.

[Puncture Test]

Using a handy compressor test device KES-G5 (trademark), the microporous membrane was secured using a test piece holder with a diameter of an opening of 11.3 mm. Next, by performing a puncture test on the center part of the secured microporous membrane, in which the curvature radius of the tip of a needle was 0.5 mm, the puncture speed was 2 mm/second, at an ambient temperature of 23° C., the puncture strength (gf) was measured as the maximum puncture load, the puncture elongation was measured as the change in position (mm) of the needle from where the needle contacted the microporous membrane to the point of maximum stress (puncture strength). Also, the puncture strength relative to membrane thickness (gf/μm) was calculated by dividing the obtained puncture strength (gf) by the thickness of the microporous membrane. The measured values from the puncture test are values calculated by taking measurements at points 5 cm from each edge in the transverse direction of the membrane and at the center point (total 3 points) and averaging those values.

[Constant Length Mode TMA, Stress Inflection Temperature (° C.), Stress Peak (g)]

TMA measurements of the microporous membrane were performed using the Shimadzu TMA50 (trademark). 3 mm-wide samples were cut off from the machine direction and the transverse direction on the microporous membrane, secured by chucks such that the distance between chucks was 10 mm, and a specialty probe was set. The load that was generated by the sample contracting when the initial load was set to 0.0098 N (1.0 gf), and the temperature was raised from 30° C. to 250° C. at a rate of 10° C./minute in an environment with a relative humidity of 40%±2% was measured. When the measured data is plotted as a temperature (° C.)-load (g) curve, ignoring noise (value fluctuations of ±0.07 g), the temperature at which the slope of the curve changes from 0 to a positive value is the temperature of the stress inflection point (° C., shown as "Stress inflection temperature" in Table 1), and the maximum load (g) of the TMA measured values is the stress peak value (g).

The TMA measured values are values calculated by taking measurements at points 5 cm from each edge in the transverse direction of the membrane and at the center point (total 3 points) and averaging those values.

[Calculation of Strain Rates and Ratio Thereof]

The strain rate of stretching for each step and in each direction was calculated according to the following.

Strain rate (%/second)=(stretch ratio−1)×100/(stretch length (m)/((line rate before stretch (m/second)+ line rate after stretch (m/second))/2))

Strain rate ratio=step ($B$) transverse strain rate (%/second)/step ($D$) transverse strain rate (%/second)

Stretch length refers to the distance the membrane moved in the machine direction from the beginning of stretching to the end of stretching for step (B) or step (D).

The strain rate in the transverse direction for step (D) refers only to the value calculated under the conditions of a stretching operation and dot not include a relaxation operation.

[Evaluation of Curl of Coated Membrane]

The microporous membrane provided with an inorganic coating layer was cut into a 20 cm in the machine direction by 20 cm in the transverse direction and placed on a flat stand. 30 seconds thereafter, a length A (cm) in the transverse direction of the microporous membrane in contact with the stand was measured and the curl value was calculated according to the following formula.

Curl value (cm)=20 (cm)−$A$ (cm).

As the length A (cm) in the transverse direction at which the microporous membrane is in contact with the stand, locations which were all in contact with the stand in the machine direction of the microporous membrane were measured.

The measurement was performed at a temperature of 23±2° C., and at a relative humidity of 40%±2%. The calculated curl value was evaluated according to the following criteria.

S (Excellent): Curl value is not less than 0.0 cm and less than 3.1 cm

A (Good): Curl value is not less than 3.1 and less than 6.1 cm

B (Fair): Curl value is not less than 6.1 and less than 9.0 cm

C (Poor): Curl value is not less than 9.0 cm and not more than 20.0 cm

[Impact Test, Safety Confirmation Test]

a. Creating the Positive Electrode

A slurry was prepared by dispersing lithium cobalt composite oxide $LiCoO_2$ as a positive electrode active substance and graphite and acetylene black as conductive materials in polyvinylidene fluoride (PVDF) as a binder and N-methylpyrrolidone (NMP). The slurry was applied using a die coater to 15 μm-thick aluminum foil to be the positive electrode current collector, dried for 3 minutes at 130° C., and then compression molded with a roll press. The obtained molded body was cut with a width of 57.0 mm to form the positive electrode.

b. Creating the Negative Electrode

A slurry was prepared by dispersing artificial graphite as a negative electrode active substance and ammonium salt of carboxymethyl cellulose and styrene-butadiene copolymer latex as binders in purified water. The slurry was applied to copper foil to be the negative electrode current collector using a die coater, dried for 3 minutes at 120° C., and then compression molded with a roll press. The obtained molded body was cut with a width of 58.5 mm to form the positive electrode.

c. Preparing the Nonaqueous Electrolytic Solution

In a mixed solvent of a ratio of ethylene carbonate: dimethyl carbonate:ethylmethyl carbonate: of 1:1:2 (volumetric ratio), $LiPF_6$ was dissolved as a solute to a concentration of 1 mol/L to prepare the nonaqueous electrolytic solution.

d. Assembling the Battery

After laminating the positive electrode and the porous membrane obtained in the Examples or Comparative Examples and the negative electrode, a wound electrode body was created through a standard method. The number of turns was adjusted for the thickness of the PO microporous membrane. The outermost circumferential end of the wound electrical body was secured by applying insulating tape. The negative electrode lead was welded to the battery can, the positive electrode lead was welded to the safety valve, and the wound electrode body was inserted into the battery can. Thereafter, 5 g of non-aqueous electrolytic solution was injected into the battery can, and the lid was caulked to the battery can through a gasket, whereby a cylindrical secondary battery with an outer circumference of 18 mm and a height of 65 mm was obtained. This cylindrical secondary battery was charged in an ambient temperature of 25° C. at a current value of 0.2 C (current of 0.2 times the hourly rate (1 C) of standard electrical capacity) up to a battery voltage of 4.2 V, and then, once attained, was charged for a total of 3 hours using a method of restricting the current value in order to maintain 4.2 V. Thereafter, the battery was discharged at a current value of 0.2 C until the battery voltage was 3.0 V. The cell rate (%) for maintaining capacity not less than 0% was calculated as a self-discharge characteristic.

e. Impact Test

Figure 2:
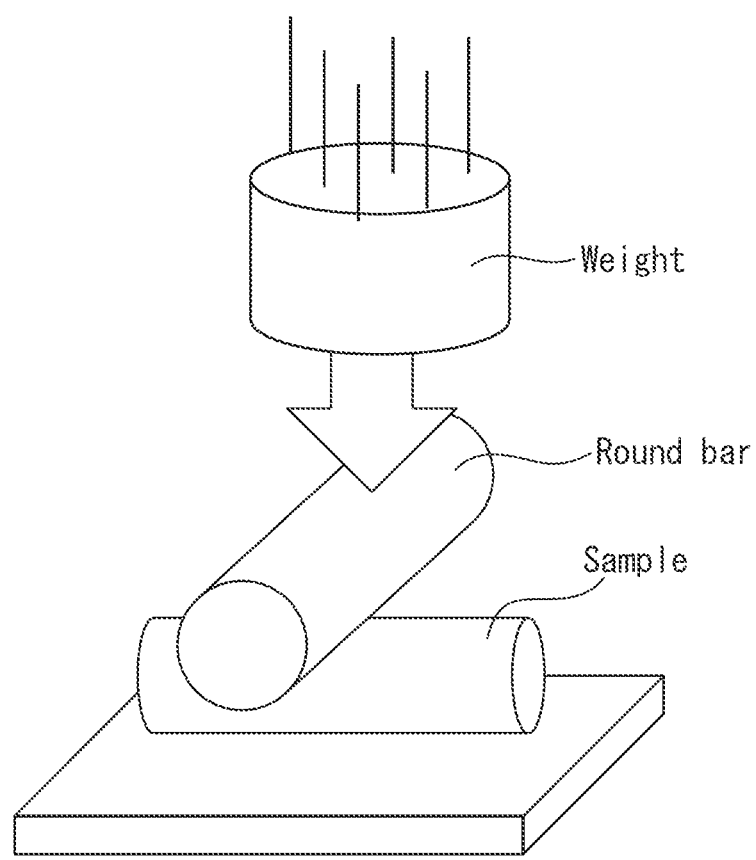
FIG. 2 is a schematic diagram representing an impact test.

FIG. 2 is a schematic drawing of an impact test.

In an impact test, a round bar (φ=15.8 mm) was placed substantially perpendicularly on a test piece placed on a test stand, an 18.2 kg weight was dropped from a height 61 cm above the round bar on to the upper surface of the round bar, and the effects of the impact on the test piece were observed.

With reference to FIG. 2, the procedure of the impact test for the Examples and Comparative Examples will be explained below.

In a 25° C. environment, the secondary battery obtained above is charged at 1 C constant current, and thereafter, the battery was charged at 4.2V constant voltage for 3 hours in total.

In a 25° C. environment, the secondary battery was then placed facing transversally on flat surfaces, and a stainless steel round bar with a diameter of 15.8 mm was placed so as to intersect the center part of the secondary battery. The round bar was placed such that the longitudinal axis was parallel with the machine direction of the separator. An 18.2 kg weight was dropped from a height of 61 cm such that the impact was applied at a right angle to the secondary battery transverse direction from the round bar placed at the center part of the secondary battery. The surface temperature of the secondary battery was measured at 3 seconds and 3 minutes after impact. The test was performed for 5 cells at a time, which were evaluated according to the criteria below.

Regarding the present criteria, S (Excellent), A (Good), and B (Fair) were considered passing. The surface temperature of the secondary battery is the temperature measured by a thermocouple (K-type seal type) at a position 1 cm from the bottom side of the outer covering of the secondary battery.

S (Excellent): Rise in surface temperature was not more than 30° C. for all cells.

A (Good): Rise in surface temperature was not more than 50° C. for all cells.

B (Fair): There were cells with surface temperatures from 50° C. to 100° C., but all were not more than 100° C.

C (Poor): One or more cells had a surface temperature above 100° C. or ignited.

Regarding the impact test, opening a large hole in the battery such the current flows through a larger area when the membrane ruptures at the moment of impact is effective for safety. However, when the impact is extremely light, the size of the hole immediately after impact is not sufficient, and current cannot be dissipated, such that when the surface temperature rises, the contact area of the electrodes is prevented from expanding more than at the time of impact, whereby further battery temperature rise is prevented and thermal runaway can be suppressed. Essentially, it is considered that, in the case that the battery surface temperature does not rise after 3 seconds, the puncture elongation of the membrane is low, such that the membrane is definitively punctured by foreign matter, and local heating of the short circuit part by battery current concentration can be prevented.

Additionally, in the case that the battery surface temperature 3 seconds after impact rose to less than 100° C. and the battery surface temperature 3 minutes after impact did not rise further, it was considered that thermal runaway of the battery was beginning to occur due to the influence of the degree of impact and the size of foreign matter, but the high heat resistance of the membrane prevented shrinkage of the microporous membrane, and thus, the contact area between electrodes was prevented from expanding more than at the time of impact, such that thermal runaway was prevented 3 minutes after impact.

Additionally, when the battery surface temperature 3 seconds after and 3 minutes after impact rose, it is considered that when the foreign matter penetrated the microporous membrane, the contact area between electrodes was insufficient, heating occurred, and since the membrane heat resistance was low, the contact area of the electrodes expanding further, and thermal runaway continued.

Example 1

(A) 45 weight % of high density polyethylene with Mv of 700,000, 45 weight % of high density polyethylene with Mv of 250,000, and 10 weight % of homopolypropylene with Mv of 400,000 were dry blended using a tumbler blender, and a starting material resin mixture was obtained. 32 weight % of the starting material resin mixture, 68 weight % of liquid paraffin, and 1 weight % of antioxidant were mixed to obtain a polyolefin composition. Thereafter, the polyolefin composition was inserted into a twin screw extruder, the melted polyolefin composition was extruded with a die lip spacing of 820 μm to form a gel-like sheet, which was cooled and solidified with a cast roll.

(B) Using a simultaneous twin screw extruder, the cooled and solidified sheet was rolled at a preset temperature of 122° C. at an area ratio of 49 times (machine direction stretch ratio 7 times, transverse direction stretch ratio 7 times) at a strain rate in the machine direction of 22%/ second and at a strain rate in the transverse direction of 3.0 times the strain rate in the transverse direction in (D) below to obtain a stretched sheet.

(C) Thereafter, the stretched sheet was immersed in methylene chloride, the liquid paraffin was extracted and removed, and the sheet was dried and porosified.

(D) Furthermore, the obtained porous body was stretched 1.5 times in the transverse direction by a uniaxial stretching machine at a temperature of 130° C. to obtain a polyolefin microporous membrane with a thickness of 6.0 μm.

The polyolefin microporous membrane was evaluated according to the above method. The results are shown in Table 1. Additionally, FIG. 3 shows the temperature-load curve from the TMA measurements of polyolefin microporous membrane.

Corona discharge treatment (discharge amount 50 W) was performed on the surface of the polyolefin microporous membrane obtained above. 95.0 parts by weight of aluminum hydroxide oxide (boehmite, block, average particle diameter 1.0 μm, specific surface area 8 m²/g), 4.0 parts by weight of a mixture of a polymer whose main structural units are 2-ethylhexyl acrylate (EHA: solid content concentration 40%, average particle diameter 145 nm, minimum membrane forming temperature not more than 0° C.) and a polymer whose main structural units are butyl acrylate (BA: solid content concentration 40%, average particle diameter 300 nm, minimum membrane forming temperature not more than 0° C.) as an acrylic latex polymer and 1.0 part by weight of an aqueous solution of ammonium polycarboxylate (SN Dispersant 5468, San Nopco Corp.) were uniformly dispersed in 100 parts by weight of water to obtain a coating liquid. After applying the coating liquid to the treated surface of the above polyolefin microporous membrane using a gravure coater, the membrane was dried at 60° C. to remove water, a porous layer with a thickness of 5 μm formed on the porous membrane, to obtain a separator with a total thickness of 11 μm. Results of curling of the obtained separator are shown in Table 1.

Examples 2 to 11 and Comparative Examples 1 to 9

Polyolefin microporous membranes were obtained in a manner similar to Example 1, except that the manufacturing conditions indicated in Table 1 were used, and evaluated. The results are shown in Table 1 below.

Examples 12 and 13

(A) A polyolefin resin mixture was obtained by dry blending 25 weight % of My 2,000,000 polyethylene, 15 weight % of MV700,000 high density polyethylene, 30 weight % of MV250,000 high density polyethylene, and 30 weight % of MV150,000 high density polyethylene in a tumbler blender. A polyolefin composition was obtained by mixing 35 weight % of the starting material resin mixture, 65 weight % of liquid paraffin, and 1 weight % of antioxidant. Using the thus-obtained polyolefin microporous membrane was obtained in a manner similar to Example 1, except that the manufacturing conditions indicated in Table 1 were used, and evaluated. The results are shown in Table 1 below.

Comparative Example 10

(A) A polyethylene composition which contains 20 weight % of ultra high molecular weight polyethylene (UHMWPE) having a weight average molecular weight of $2.0×10^6$, 80 weight % of high density polyethylene (HDPE) having a weight average molecular weight of $3.5×10^5$, and, as an antioxidant, 0.375 parts by weight of tetorakis[methylene-3-(3,5-di-t-butyl-4-hydroxyphenyl)-propionate] methane relative to 100 parts by weight of the composition was obtained. Using the thus-obtained resin composition, a polyolefin microporous membrane was obtained in a manner similar to Example 1, except that the manufacturing conditions indicated in Table 1 were used, and evaluated. The results are shown in Table 1 below.

Comparative Example 11

A polyolefin microporous membrane was obtained in a manner similar to Example 1, except that the biaxial stretching of step (B) was changed to sequential biaxial stretching, and evaluated. The results are shown in Table 1 below.

TABLE 1

Table 1A

| | | | Example 1 | Example 2 | Example 3 | Example 4 | Example 5 | Example 6 | Example 7 |
|---|---|---|---|---|---|---|---|---|---|
| | PC | % | 32 | 32 | 32 | 32 | 32 | 32 | 32 |
| | C/C | μm | 820 | 820 | 820 | 820 | 820 | 820 | 820 |
| | Biaxial stretching temperature | °C. | 122 | 122 | 122 | 122 | 122 | 122 | 123 |
| | Surface stretch rate | times | 49 | 49 | 49 | 49 | 49 | 49 | 49 |
| Strain rate | Biaxial stretching in machine direction | %/sec | 22 | 22 | 22 | 48 | 48 | 48 | 33 |
| | MAX HS magnification | times | 1.75 | 1.75 | 1.75 | 1.75 | 1.75 | 1.75 | 1.75 |
| | MIN HS magnification | times | 1.5 | 1.5 | 1.5 | 1.5 | 1.5 | 1.5 | 1.5 |
| | HS stretching temperature | °C. | 130 | 133 | 133 | 133 | 133 | 133 | 132 |
| Strain rate ratio | Biaxial in transverse direction/ heat setting in transverse direction | | 3.0 | 9.8 | 2.1 | 3.0 | 2.1 | 9.8 | 4.7 |
| Basic Physical Characteristics | Membrane thickness | μm | 6.0 | 6.3 | 6.0 | 6.4 | 5.8 | 6.2 | 6.0 |
| | Basis weight | g/m² | 3.36 | 3.59 | 3.48 | 3.77 | 3.31 | 3.36 | 3.31 |
| | Porosity | % | 41 | 40 | 39 | 38 | 40 | 43 | 42 |
| | Puncture strength | gf | 226 | 213 | 231 | 254 | 218 | 224 | 192 |
| | Puncture strength relative to membrane thickness | gf/μm | 37 | 34 | 39 | 40 | 38 | 36 | 32 |
| | Puncture elongation | mm | 1.85 | 1.90 | 1.83 | 1.78 | 1.76 | 1.82 | 1.83 |
| TMA | Machine direction Stress inflection temperature | °C. | 90 | 92 | 86 | 80 | 83 | 78 | 95 |
| | Stress peak | g | 1.8 | 1.7 | 1.6 | 1.9 | 1.9 | 2.1 | 1.7 |
| | Transverse direction Stress inflection temperature | °C. | 110 | 115 | 101 | 108 | 97 | 109 | 104 |
| | Stress peak | g | 1.3 | 1.2 | 1.5 | 1.4 | 1.6 | 1.5 | 1.4 |
| Results | Curl value | | S | S | A | S | A | B | S |
| | Battery surface temperature 3 seconds after impact | | S | A | S | S | S | S | S |
| | Battery surface temperature 3 minutes after impact | | S | A | A | A | A | A | S |

| | | | Example 8 | Example 9 | Example 10 | Example 11 | Example 12 | Example 13 |
|---|---|---|---|---|---|---|---|---|
| | PC | % | 32 | 32 | 32 | 32 | 35 | 35 |
| | C/C | μm | 1050 | 830 | 820 | 1320 | 900 | 1000 |
| | Biaxial stretching temperature | °C. | 125 | 117 | 121 | 123 | 123 | 121 |
| | Surface stretch rate | times | 49 | 49 | 49 | 49 | 49 | 49 |
| Strain rate | Biaxial stretching in machine direction | %/sec | 22 | 45 | 22 | 48 | 40 | 40 |
| | MAX HS magnification | times | 1.78 | 2 | 1.75 | 1.93 | 1.55 | 1.7 |
| | MIN HS magnification | times | 1.55 | 1.8 | 1.5 | 1.65 | 1.2 | 1.45 |
| | HS stretching temperature | °C. | 132 | 133 | 135 | 134 | 127 | 128 |
| Strain rate ratio | Biaxial in transverse direction/ heat setting in transverse direction | | 6.0 | 8.0 | 3.0 | 6.0 | 9.0 | 6.0 |
| Basic Physical Characteristics | Membrane thickness | μm | 7.1 | 5.0 | 5.2 | 10.0 | 10.0 | 8.3 |
| | Basis weight | g/m² | 4.25 | 3.04 | 3.21 | 5.89 | 5.80 | 4.73 |
| | Porosity | % | 37 | 36 | 35 | 38 | 39 | 40 |
| | Puncture strength | gf | 251 | 270 | 230 | 355 | 305 | 254 |
| | Puncture strength relative to membrane thickness | gf/μm | 35 | 54 | 44 | 36 | 31 | 31 |
| | Puncture elongation | mm | 1.88 | 2.10 | 1.50 | 2.05 | 2.25 | 1.84 |
| TMA | Machine direction Stress inflection temperature | °C. | 72 | 84 | 105 | 67 | 60 | 78 |
| | Stress peak | g | 1.9 | 2.0 | 1.5 | 2.1 | 2.9 | 2.5 |
| | Transverse direction Stress inflection temperature | °C. | 113 | 91 | 121 | 110 | 113 | 126 |
| | Stress peak | g | 1.3 | 1.8 | 1.0 | 1.8 | 1.4 | 1.6 |
| Results | Curl value | | S | B | S | B | B | B |
| | Battery surface temperature 3 seconds after impact | | A | B | S | B | B | S |
| | Battery surface temperature 3 minutes after impact | | A | B | S | B | B | A |

TABLE 1B

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | PC | % | 32 | 32 | 32 | 32 | 32 | 32 |
|  | C/C | μm | 920 | 820 | 820 | 820 | 820 | 820 |
|  | Biaxial stretching temperature | °C. | 117 | 122 | 122 | 122 | 122 | 122 |
|  | Surface stretch rate | times | 49 | 49 | 49 | 49 | 49 | 49 |
| Strain rate | Biaxial stretching in machine direction | %/sec | 22 | 22 | 18 | 53 | 18 | 18 |
|  | MAX HS magnification | times | 2 | 1.75 | 1.75 | 1.75 | 1.75 | 1.75 |
|  | MIN HS magnification | times | 1.8 | 1.5 | 1.5 | 1.5 | 1.5 | 1.5 |
|  | HS stretching temperature | °C. | 131 | 131 | 131 | 131 | 131 | 131 |
| Strain rate ratio | Biaxial in transverse direction/ heat setting in transverse direction |  | 1.5 | 11.0 | 3.0 | 3.0 | 1.5 | 11.0 |
| Basic physical characteristics | Membrane thickness | μm | 6.5 | 5.7 | 6.2 | 6.3 | 6.4 | 5.6 |
|  | Basis weight | g/m² | 3.77 | 3.30 | 3.48 | 3.29 | 3.53 | 3.40 |
|  | Porosity | % | 39 | 39 | 41 | 45 | 42 | 36 |
|  | Puncture strength | gf | 277 | 218 | 253 | 232 | 243 | 233 |
|  | Puncture strength relative to membrane thickness | gf/μm | 43 | 38 | 41 | 37 | 38 | 42 |
|  | Puncture elongation | mm | 1.84 | 2.50 | 2.60 | 1.76 | 2.60 | 2.73 |
| TMA | Machine direction Stress inflection temperature | °C. | 65 | 77 | 98 | 76 | 87 | 72 |
|  | Stress peak | g | 2.4 | 2.2 | 2.3 | 3.4 | 2.2 | 2.5 |
|  | Transverse direction Stress inflection temperature | °C. | 77 | 113 | 109 | 75 | 73 | 78 |
|  | Stress peak | g | 2.3 | 1.8 | 1.4 | 2.4 | 2.5 | 1.9 |
| Result | Curl value |  | C | B | B | C | C | C |
|  | Battery surface temperature 3 seconds after impact |  | S | C | C | S | C | C |
|  | Battery surface temperature |  | B | C | C | B | C | C |

|  |  |  | Comparative Example 7 | Comparative Example 8 | Comparative Example 9 | Comparative Example 10 | Comparative Example 11 |
|---|---|---|---|---|---|---|---|
|  | PC | % | 32 | 32 | 32 | 30 | 35 |
|  | C/C | μm | 820 | 820 | 1580 | 1200 | 3200 |
|  | Biaxial stretching temperature | °C. | 122 | 117 | 121 | 115 | 123 |
|  | Surface stretch rate | times | 49 | 49 | 49 | 25 | 49 |
| Strain rate | Biaxial stretching in machine direction | %/sec | 53 | 53 | 26 | 26 | 15 |
|  | MAX HS magnification | times | 1.75 | 1.75 | 1.93 | 1 | 1.6 |
|  | MIN HS magnification | times | 1.5 | 1.5 | 1.65 | 1 | 1.4 |
|  | HS stretching temperature | °C. | 131 | 131 | 131 | 125 | 130 |
| Strain rate ratio | Biaxial in transverse direction/ heat setting in transverse direction |  | 1.5 | 11.0 | 1.8 | 0 | 1 |
| Basic physical characteristics | Membrane thickness | μm | 6.0 | 5.6 | 11.3 | 25.6 | 20.0 |
|  | Basis weight | g/m² | 3.36 | 2.93 | 6.23 | 13.33 | 8.93 |
|  | Porosity | % | 41 | 45 | 42 | 45.2 | 53 |
|  | Puncture strength | gf | 225 | 247 | 433 | 500 | 479 |
|  | Puncture strength relative to membrane thickness | gf/μm | 38 | 44 | 38 | 20 | 24 |
|  | Puncture elongation | mm | 2.50 | 2.53 | 2.12 | 2.70 | 2.60 |
| TMA | Machine direction Stress inflection temperature | °C. | 68 | 73 | 66 | 86 |  |
|  | Stress peak | g | 4.3 | 5.2 | 2.7 | 5.2 | 10.0 |
|  | Transverse direction Stress inflection temperature | °C. | 74 | 79 | 114 | 77 |  |
|  | Stress peak | g | 2.0 | 1.9 | 2.9 | 5.0 | 3.0 |
| Result | Curl value |  | C | C | C | C | C |
|  | Battery surface temperature 3 seconds after impact |  | C | C | B | C | C |
|  | Battery surface temperature |  | C | C | C | C | C |

Explanation of symbols in Table 1.
PC: Content of starting material resin mixture in polyolefin composition [%]
C/C: Die lip spacing
HS: Heat setting

REFERENCE SIGNS LIST

1 Separator
2A, 2B Electrode plates
3 Foreign matter
4 Electrode contact portion

The invention claimed is:

1. A polyolefin microporous membrane having a puncture elongation of not more than 2.30 mm, a temperature at a stress inflection point of not less than 80.0° C., and a stress peak value of not more than 1.8 g in thermomechanical analysis (TMA) measurement of a transverse direction of the polyolefin microporous membrane, wherein the polyolefin microporous membrane is a single layer excluding an inorganic coating layer at a measurement of the puncture elongation and the TMA measurement performed in constant length mode.

2. The polyolefin microporous membrane according to claim 1 wherein the puncture elongation is not more than 2.10 mm, the temperature at the stress inflection point is not less than 90.0° C., and the stress peak value is not more than 1.4 g in the TMA measurement of the transverse direction of the polyolefin microporous membrane.

3. The polyolefin microporous membrane according to claim 1 wherein the puncture elongation is not less than 0.5 mm, the temperature at the stress inflection point is not more than 180.0° C., and the stress peak value is not less than 0.3 g in the TMA measurement of the transverse direction of the polyolefin microporous membrane.

4. The polyolefin microporous membrane according to claim 1 wherein puncture strength per unit thickness is less than 70 gf/μm.

5. The polyolefin microporous membrane according to claim 4 wherein the puncture strength per unit thickness is not less than 10 gf/μm.

6. The polyolefin microporous membrane according to claim 1 wherein a stress peak value is not more than 2.0 g in TMA measurement of a machine direction of the polyolefin microporous membrane.

7. The polyolefin microporous membrane according to claim 6 wherein the stress peak value is not less than 0.3 g in TMA measurement of the machine direction of the polyolefin microporous membrane.

8. The polyolefin microporous membrane according to claim 6, wherein puncture strength per unit thickness is less than 70 gf/μm.

9. The polyolefin microporous membrane according to claim 8, wherein the puncture elongation is not less than 0.5 mm, the temperature at the stress inflection point is not more than 180.0° C., and the stress peak value is not less than 0.3 g in the TMA measurement of the transverse direction.

10. The polyolefin microporous membrane according to claim 9, wherein the stress peak value is not less than 0.3 g in TMA measurement of the machine direction.

11. The polyolefin microporous membrane according to claim 10, wherein the puncture strength per unit thickness is not less than 10 gf/μm.

12. A method for manufacturing a polyolefin microporous membrane according to claim 1 comprising the following steps:
   (A) extruding a polyolefin composition comprising a polyolefin resin and a pore-forming material to form a gel-like sheet;
   (B) biaxially stretching the gel-like sheet to form a stretched sheet;
   (C) extracting the pore-forming material from the stretched sheet to form a porous membrane; and
   (D) heat setting the porous membrane; wherein
strain rate in a machine direction in step (B) is not less than 20%/second and not more than 50%/second, and a ratio of the strain rate in the transverse direction in step (B) to the strain rate in the transverse direction in step (D) is not less than 2.0 and not more than 10.0.

13. The method of manufacturing a polyolefin microporous membrane according to claim 12, wherein the polyolefin microporous membrane has a puncture elongation of not less than 0.5 mm, the temperature at the stress inflection point of not more than 180.0° C., a stress peak value of not less than 0.3 g in thermomechanical analysis (TMA) measurement of the transverse direction.

14. The method for manufacturing a polyolefin microporous membrane according to claim 12 wherein in step (B), the gel-like sheet is simultaneously biaxially stretched.

15. The method of manufacturing a polyolefin microporous membrane according to claim 14, wherein the polyolefin microporous membrane has a puncture elongation of not less than 0.5 mm, the temperature at the stress inflection point of not more than 180.0° C., a stress peak value of not less than 0.3 g in thermomechanical analysis (TMA) measurement of the transverse direction.

* * * * *